Nov. 15, 1938.  E. P. O'CONNOR  2,136,519
STEAM OPERATED CYLINDER RELIEF AND DRAIN VALVE
Filed June 26, 1936
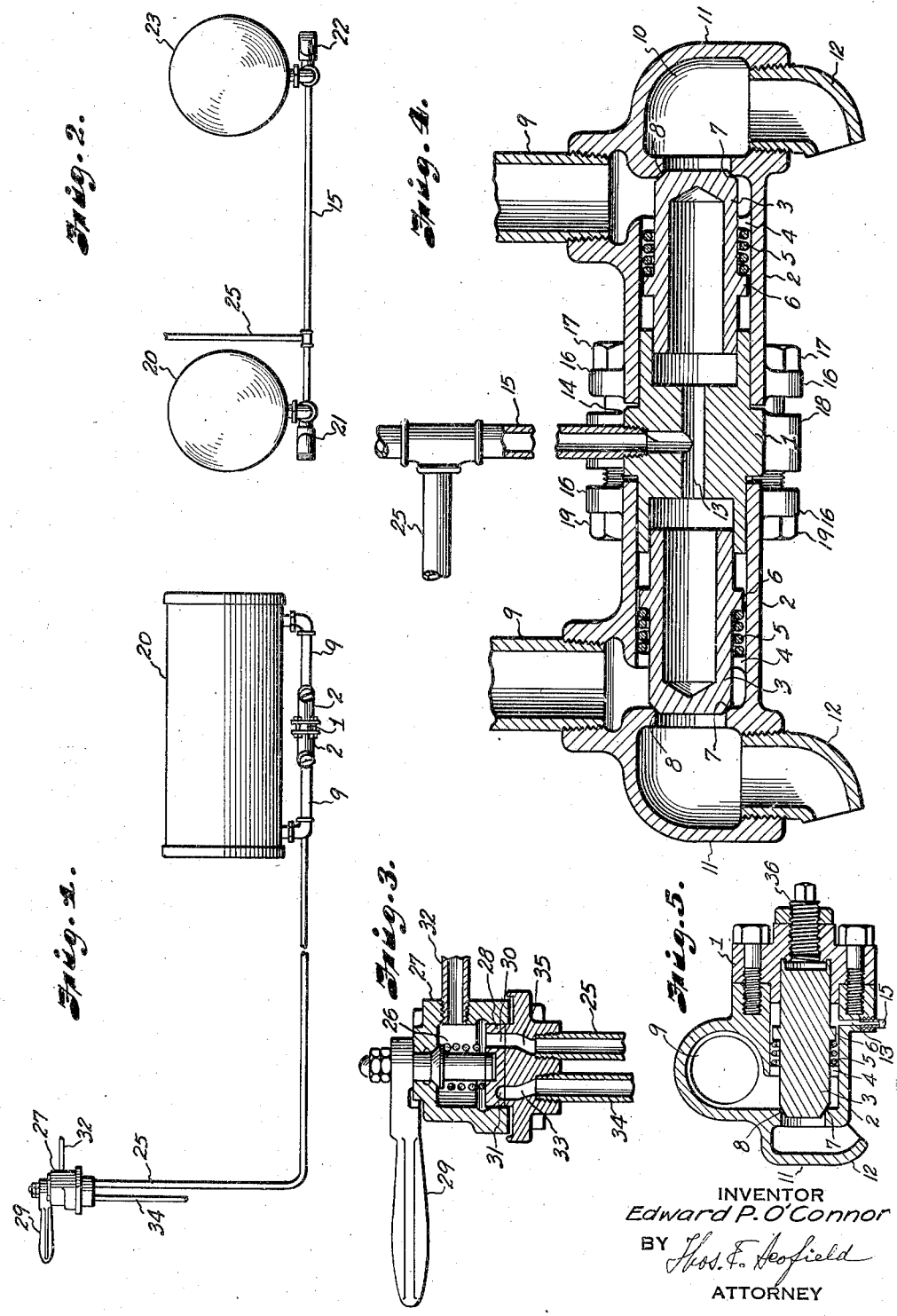
INVENTOR
Edward P. O'Connor
BY Thos. F. Scofield
ATTORNEY Patented Nov. 15, 1938

2,136,519

UNITED STATES PATENT OFFICE 2,136,519

STEAM OPERATED CYLINDER RELIEF AND DRAIN VALVE

Edward P. O'Connor, Pittsburg, Kans.

Application June 26, 1936, Serial No. 87,395

3 Claims. (Cl. 121—134)

My invention relates to steam operated cylinder relief and drain valves and more particularly to a combined relief and drain valve for use in connection with locomotive cylinders adapted to be operated from the cab of a locomotive.

A properly designed cylinder relief and drain valve must provide a high factor of safety under high boiler pressures. It must be quick acting in order to assure ready and immediate response for the relief of cylinders when unusual pressures are imposed thereon. The drain valve must be adapted to vent the cylinder when the operating valve is closed. It must be free of steam leaks and be composed of a minimum number of parts in order to assure low maintenance costs.

One object of my invention is to provide a cylinder relief and drain valve in which the relief action is entirely automatic but which will be enabled to be opened from the operating cab of a locomotive at will.

Another object of my invention is to provide a combined cylinder and relief drain valve which will open automatically when the stem pressure in the boiler dies, thus effecting automatic drainage and preventing accidental movement of the locomotive due to a leaky throttle.

Another object of my invention is to provide a combined cylinder relief and drain valve which will open automatically when excess pressure exists in the cylinder, due to the presence of water as a result of foaming or the carrying over of water into the cylinders. The relief valve can be made to open automatically with any cylinder pressure desired above boiler pressure, thus protecting cylinder heads from damage due to excess pressure.

Another object of my invention is to provide for the continuous circulation of steam from the boiler through the cylinder relief valve to provide for lubrication when the locomotive is drifting.

Other and further objects of my invention will appear from the following description.

In the accompanying drawing which forms part of the instant specification and is to be read in conjunction therewith and in which like reference numerals are used to indicate like parts in the various views;

Figure 1 is a diagrammatic view of an assembly containing my combined cylinder relief and drain valve, showing one connection of parts.

Figure 2 is a diagrammatic end view showing a pair of valves fitted to the cylinders of a locomotive.

Figure 3 is a sectional view of the steam operating valve, located in the cab of a locomotive, in closed position.

Figure 4 is a sectional view of a tandem arrangement of a pair of cylinder relief and drain valves showing one form of my invention.

Figure 5 is a sectional elevation of a cylinder relief and drain valve showing another embodiment of my invention.

In general, my invention contemplates the provision of a differential piston valve adapted to be seated by steam pressure against the action of a spring. The valve is such that a smaller area is presented to the pressure within the cylinder than to boiler pressure, so that the valve will tend to remain in seated position unless the cylinder pressure exceeds the pressure within the boiler. The amount of this excess of pressure which is desired, determines the differential area of the valve.

More particularly referring now to the drawing, to a suitable connecting member 1, I mount a pair of cylinders 2, in which the differential pistons 3 are lodged. Cylinders 2 are formed with internal lugs 4, adapted to form the seat of springs 5. The differential pistons 3 are formed with flanges 6. The flanges 6 are appreciably smaller than the internal diameter of cylinders 2 so that steam may escape past the piston-like flanges 6. One end of differential piston 3 is formed with a valve surface 7 adapted to seat upon valve seat 8. The valve 7 controls a passage from pipe 9 to the space 10 formed in the valve body 11. A discharge pipe 12 communicates with the space 10. Connecting member 1 is provided with an axial bore 13, communicating with a transverse duct 14 with which a pipe 15 is adapted to communicate. The valve bodies 11 comprise the cylinders 2, which are formed with external lugs 16. Through bolts 17 are adapted to pass through lugs 16 and lugs 18 so that nuts 19 may hold the valve bodies 11 to the connecting member 1. Pipe 15 extends transversely to a connecting member 1 attached to another cylinder of a locomotive on the opposite side to the cylinder to which the connecting member 1 shown in Figure 4 is connected, as can be readily seen by reference to Figure 2 in which there are a pair of valve assemblies 21 attached to a cylinder 20 and a pair of valve assemblies 22 attached to a cylinder 23. The pipe 15 communicates with a pipe 25 which leads to a chamber 26 formed in a valve body 27. A rotary valve 28 adapted to be operated by handle 29 is provided with a port 30 and a groove 31. A pipe 32 is connected to the boiler.

In the position shown in Figure 3, steam pressure from the boiler enters chamber 26 permitting steam to pass through port 30, through pipe 25 to pipe 15, through duct 14, through duct 13, into the cylinder 2, moving the piston 3 to the position shown in Figure 4 against the action of spring 5. This movement will take place due to steam pressure. Pipe 9 communicates with the cylinder and since the valve 7 is seated, the steam pressure in the cylinder can act only upon the flange 6, which is of smaller area than the area subjected to the steam pressure on the side of the piston opposite. If it is desired to "blow" the cylinder, the operating handle is moved to permit arcuate groove 31 to embrace both the port 33 which communicates through pipe 34 to the atmosphere and the port 35, which communicates with pipe 25. The port 30 in valve 29 will move to a position preventing the steam pressure within chamber 26 from acting upon port 35 and, at the same time, connect port 35 with port 33 and thence to the atmosphere. The pressure behind piston 3 tending to hold it on its seat being thus relieved, the spring and the steam pressure within the cylinder will move the valve to the left, thus providing communication between the exhaust pipe 12 and pipe 9 which communicates with the cylinder. When it is desired to again close the relief valve, operating handle 29 is operated to allow the boiler pressure to be imposed behind the piston 3. This pressure will be higher than the cylinder pressure since the cylinder pressure is always relieved whenever valve 7 is off its seat. Any excess pressure within the cylinder, in excess of the boiler pressure as determined by the difference in area between the flange 6 and the projected area of the piston, will automatically move piston 3 to the left, thus relieving the excess pressure through pipe 12.

When the steam pressure is relieved in the boiler, as for example when the fires die, the pressure existing in duct 13 will likewise die, permitting spring 5 to move the valve 7 from its seat and permitting the cylinder to drain.

It will be observed that, due to the loose fit of piston 3 in the cylinder in which it operates and also due to the fact that flange 6 is loosely fitted, a feather of steam will constantly pass from the boiler through chamber 32, through chamber 26, through pipe 25, through pipe 15, through duct 14, through bore 13 past flange 6, and through pipe 9 into the cylinder. If desired, oil may be introduced into chamber 26 by any suitable means so that oil may be carried along by this flow of steam. The object of permitting a feather of steam to flow into the cylinder is to serve as lubrication. Frequently, going down grade or coasting, the locomotive is allowed to "drift". By this is meant that the locomotive is allowed to roll freely with the throttle closed. The movement of the piston of the locomotive in the locomotive cylinder without lubrication afforded by the steam, frequently does damage and scores the cylinder walls. The feather of steam, especially if it carries oil, will serve to lubricate the locomotive cylinder while it is "drifting".

The relief valve is also of service when a locomotive is standing idle either in the yards or on a siding. It has been known that locomotives will be moved by a leaky throttle causing pressure to build up in the cylinder. Whenever the locomotive is standing idle with the throttle closed, all that is necessary is to operate the relief valve handle in the cab to open the relief valve. Then, if the throttle should be leaky, no pressure can be built up in the cylinder since it will be vented through pipe 12 to the atmosphere.

Referring now to Figure 5, I show a relief valve fitted with a screw 36 which is adapted to be screwed up by hand so that the valve may be seated in event of a broken steam pipe or to close the valve when the locomotive is being given a water test.

It will be observed that I have accomplished the objects of my invention. I have provided a cylinder relief and drain valve which is controllable from the cab of a locomotive to blow the cylinder at any desired time and which will open automatically under excess pressure to relieve the cylinder heads and piston from undue strains. My cylinder relief and drain valve will open automatically when the steam pressure in the boiler dies. My construction permits a continuous supply of a small amount of steam from the boiler to the cylinder, even though the throttle is closed and the locomotive is drifting. The construction is simple and rugged, involving a minimum number of parts, assuring low maintenance costs.

It will be understood that certain features and sub-combinations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. In combination with a locomotive steam cylinder, a valve cylinder, a piston of smaller diameter than said cylinder disposed therein, a valve surface formed on said piston, a valve seat for said valve surface, a flange on said piston at an intermediate point thereof, said flange being of slightly smaller diameter than said valve cylinder in order to provide for a loose fit, means providing communication between the interior of said cylinder and the atmosphere, said valve when in seated position closing said communicating means, a spring positioned within said valve cylinder and acting against said flange to move said piston from valve seating position, means communicating with the boiler of the locomotive whereby steam pressure is adapted to hold the valve on its seat against the action of said spring, and means operable from the cab of the locomotive for venting said boiler communicating means to the atmosphere, the construction being such that the loose fit of said flange is adapted to permit a limited quantity of steam to flow from said means communicating with the boiler past said flange into the steam cylinder.

2. In combination with a locomotive steam cylinder, a valve cylinder, a piston of smaller diameter than said cylinder disposed therein, a valve surface formed on said piston, a valve seat for said valve surface, a flange on said piston at an intermediate point thereon, said flange being of slightly smaller diameter than said valve cylinder in order to provide for a loose fit, means providing communication between the interior of said cylinder and the atmosphere, said valve when in seated position closing said communicating means, a spring positioned within said valve cylinder and acting against said flange to move said piston from valve seating position, means communicating with the boiler of the locomotive whereby steam pressure is adapted to hold the valve on its seat against the action of said spring, means operable from the cab of the locomotive for venting said boiler communicating means to the atmosphere, the construction being such that the loose fit of said flange is adapted to permit a limited quantity of steam to flow from said means communicating with the boiler past said flange into the steam cylinder, and manually adjustable means for holding said piston in valve seating position.

3. A cylinder cock comprising a valve cylinder, a piston of smaller diameter than said cylinder disposed therein, a valve surface formed on said piston, a valve seat for said valve surface, a flange on said piston at an intermediate point thereof, said flange being of slightly smaller diameter than said valve cylinder in order to provide for a loose fitting, means providing communication between the interior of said cylinder and the atmosphere, said valve when in seated position closing said communicating means, a spring positioned within said valve cylinder acting against said flange to move said piston from valve seating position, means communicating with a source of steam pressure adapted to hold the valve on its seat against the action of said spring, the construction being such that the loose fit of said flange is adapted to permit a limited quantity of steam to flow from said means communicating with said source of steam past said flange.

EDWARD P. O'CONNOR.